No. 889,143. PATENTED MAY 26, 1908.
P. H. MUNROE, DEC'D.
J. VAN HORN, ADMINISTRATOR.
MOTOR PLOW.
APPLICATION FILED DEC. 19, 1906.

3 SHEETS—SHEET 1.

Witnesses:
Chas. F. Bassett
Matt. J. Marly

Inventor
Paul H. Munroe
By Frederick Benjamin
Atty.

No. 889,143. PATENTED MAY 26, 1908.
P. H. MUNROE, DEC'D.
J. VAN HORN, ADMINISTRATOR.
MOTOR PLOW.
APPLICATION FILED DEC. 19, 1906.
3 SHEETS—SHEET 2
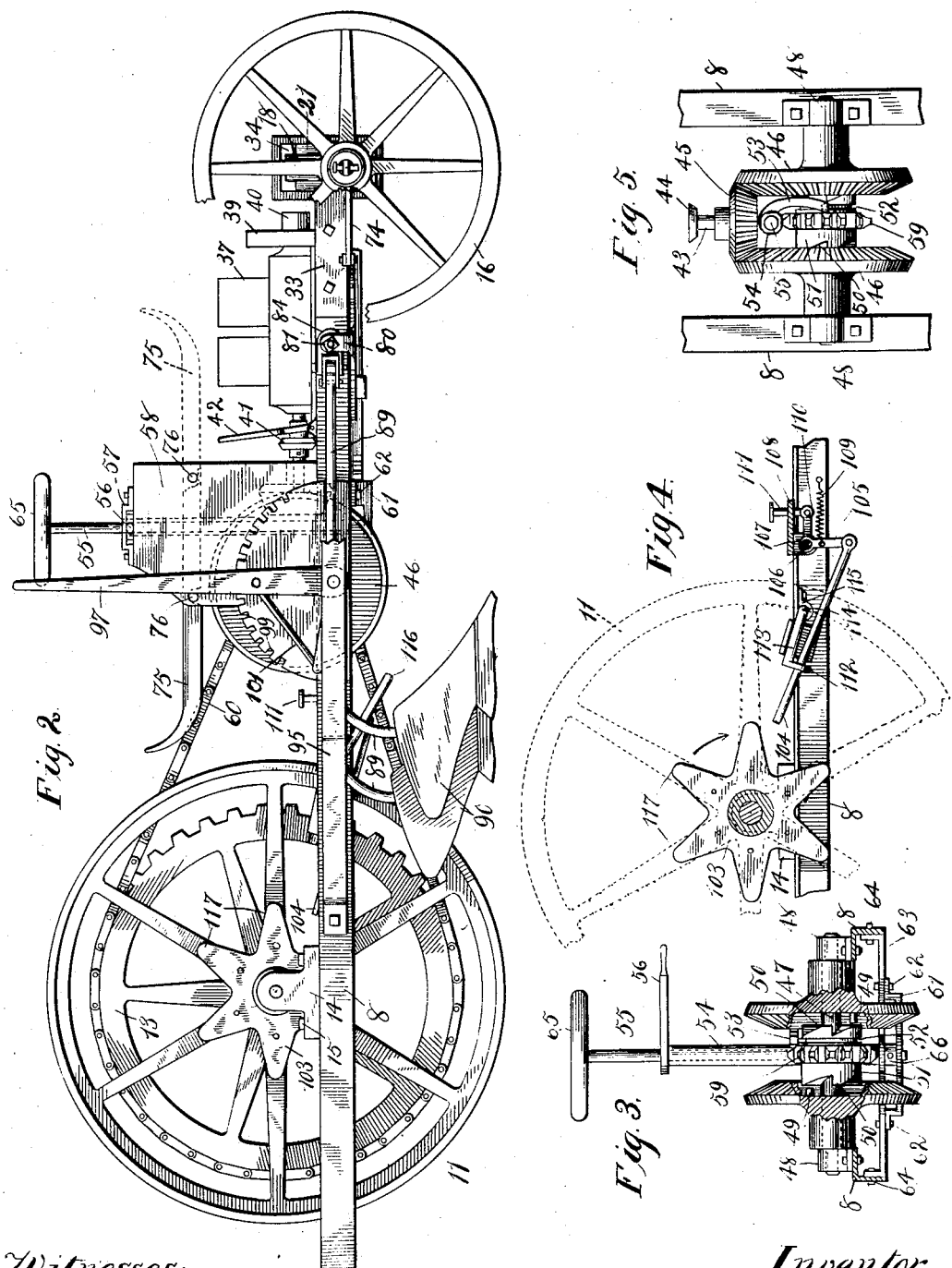
Witnesses:
Chas. F. Bassett
Matt. J. Marty
Inventor
Paul H. Munroe
By Frederick Benjamin,
Atty.

No. 889,143. PATENTED MAY 26, 1908.
P. H. MUNROE, DEC'D.
J. VAN HORN, ADMINISTRATOR.
MOTOR PLOW.
APPLICATION FILED DEC. 19, 1906.

3 SHEETS—SHEET 3.

Witnesses:
Chas. F. Bassett
Matt. J. Marty

Inventor
Paul H. Munroe
By Frederick Benjamin
Atty.

UNITED STATES PATENT OFFICE.

PAUL H. MUNROE, OF PLAINFIELD, ILLINOIS; JOHN VAN HORN ADMINISTRATOR OF SAID PAUL H. MUNROE, DECEASED.

MOTOR-PLOW.

No. 889,143.  Specification of Letters Patent.  Patented May 26, 1908.

Application filed December 19, 1906. Serial No. 348,634.

*To all whom it may concern:*

Be it known that I, PAUL H. MUNROE, a citizen of the United States, residing at Plainfield, in the county of Will and State of Illinois, have invented certain new and useful Improvements in Motor-Plows, of which the following is a specification.

My invention relates to agricultural implements and refers especially to mobile apparatus adapted to a variety of uses.

The paramount objects of my invention are to produce a mobile appliance having means whereby implements for different purposes can be readily attached thereto; to provide a motor driven apparatus having means for interchangeably attaching duplicate plows, harrows, cultivators and other farming implements; to provide a motor driven device that can be used as a traction engine; and to provide means for throwing the traction mechanism out of gear with the motor so that the latter can be utilized as a stationary source of power for any purpose desired.

Further objects of my invention are to provide means for reversing the traction mechanism so that the machine can be run with equal facility in either direction; to design a simple framework and mechanism having few parts thus conducing to economy in the manufacture; to provide means for relieving the strain upon the frame when one of the wheels supporting the forward axle is on a different level from the other; to furnish means for turning the machine in a small radius; and to enable the apparatus to travel in such manner when plowing as to avoid the necessity of leaving dead furrows.

Other objects are to provide steering means, a reversible seat for the operator, and devices for lifting the plows and other implements above the ground surface by the aid of the motive power.

Figure 1:
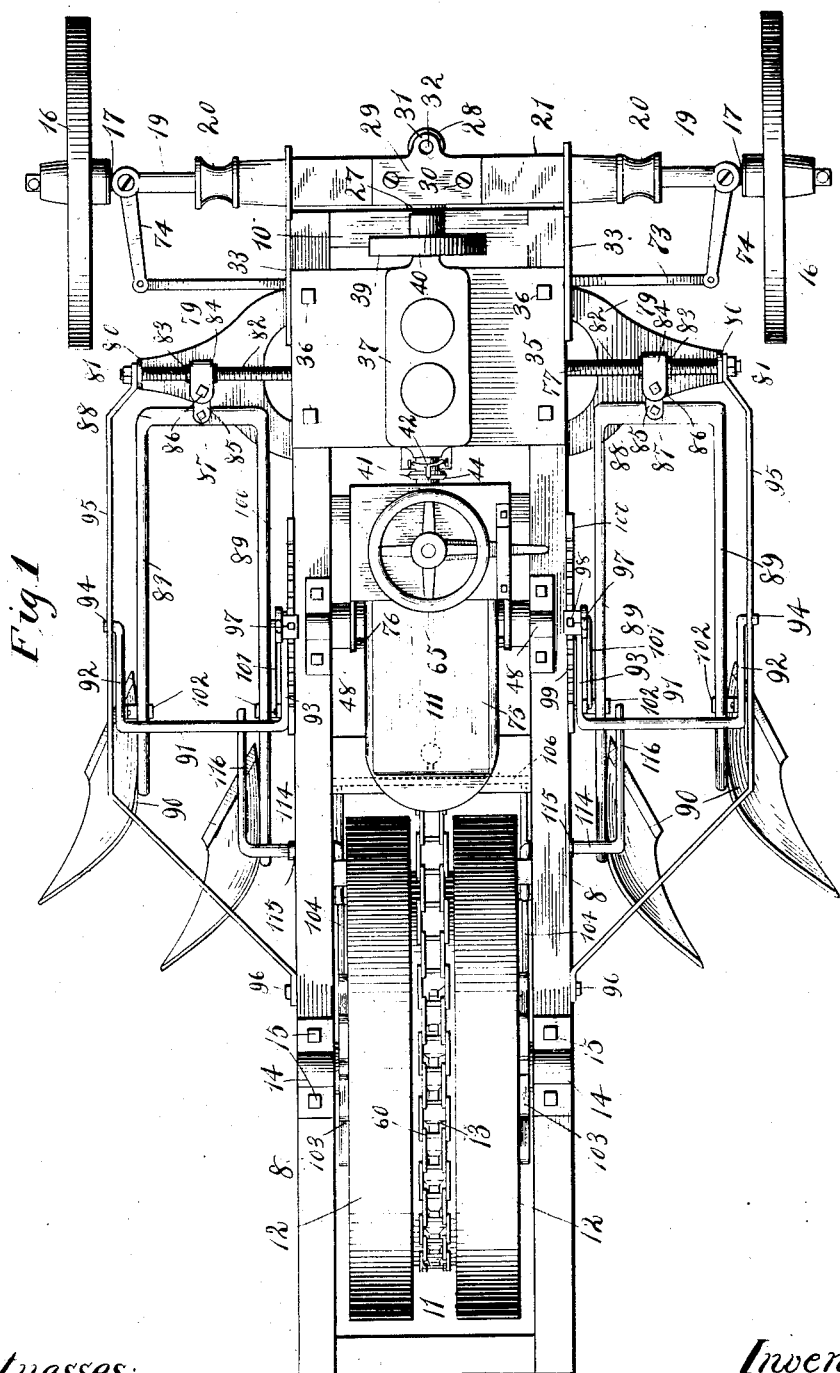
Figure 6:
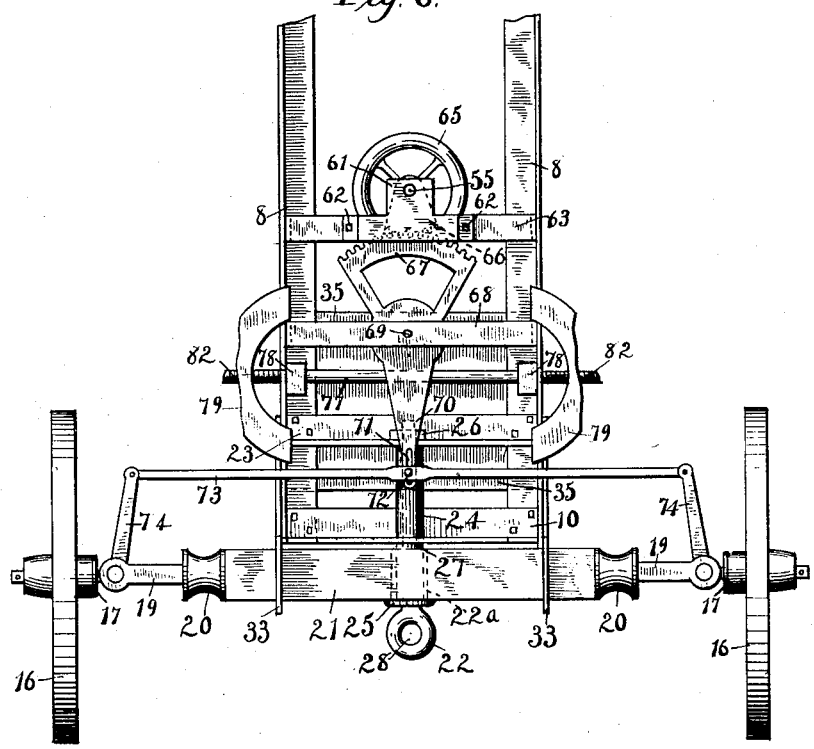
Figure 7:
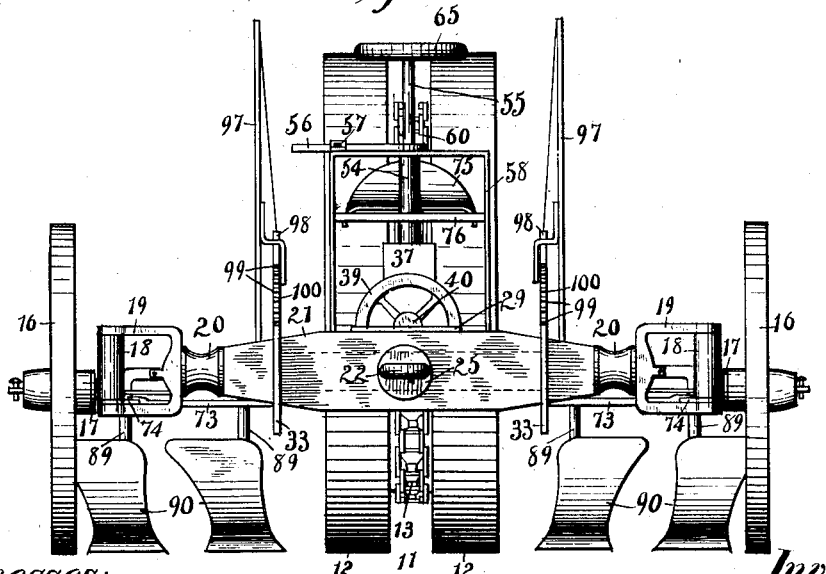

I accomplish the above and other minor objects by the use of the apparatus illustrated in the accompanying drawings which form a part of this specification and in which:

Figure 1 is a top plan view of my improved mobile apparatus with duplicate gangs of plows attached thereto; Fig. 2 is a side elevation; Fig. 3 is a rear view of the reversing gears portions of the gears being broken away; Fig. 4 is a fragmentary view showing the implement lifting cam and coöperating mechanism; Fig. 5 is a top plan view of the reversing gears, the steering wheel and reversing lever being removed; Fig. 6 is a bottom plan view of the front portion of the machine showing the steering mechanism, and Fig. 7 is a front elevation of the entire apparatus.

Referring to the drawings, 8 indicates the side members of the frame of the machine, preferably made of structural angle iron, subjoined by end tie pieces 9, 10. The frame is supported at the rear by a traction wheel 11, the thread of which is formed in two parts 12, the interval being occupied by a sprocket 13, securely fixed to the traction wheel. The axle of the said wheel is journaled in boxes 14 supported on the side members 8 of the frame and secured thereto by bolts 15. The front of the machine is supported by a pair of lighter wheels 16 which turn on arbors 17 connected with posts 18 journaled in forks 19 formed integral with collars 20 which engage the ends of an axle 21. The main frame is supported upon this axle by means of a shouldered bolt 22 which passes through a sleeve 22ª in the axle and also through the front tie piece 10 and a brace 23, made of angle iron and bolted to the side members 8. The said bolt is provided with a spacing sleeve 24, between the flanges of the tie piece 10 and the said brace 23 and is furnished with a flange 25 preferably formed integral therewith, which engages the face of the axle. The bolt is secured in position and adjusted by a nut 26 its shoulder 27 engaging the face of the tie piece 10. The head of the bolt is formed with an eye 28 and the upper face of the axle is provided with a plate 29, secured by screws 30 and having a projection 31 furnished with a bolt hole 32 which registers with the eye in the head of the shouldered bolt. Upon either side of the front of the frame are bolted guide plates 33 having apertures 34 through which the axle passes. The function of these guide plates is to receive strain upon the swivel bolt 22, and also to limit the vertical rocking movement of the axle upon the said bolt.

Upon the forward portion of the frame is a bed-plate 35 anchored to the side members by bolts 36. A motor 37 rests upon this plate, its main shaft 38 having a fly wheel 39 and a pulley 40 for the attachment of a belt when it is desired to utilize the motor as a prime mover to run auxiliary machinery. Upon the opposite end of the said shaft is mounted a friction clutch 41, operated by a lever 42, secured to the bed plate. In line with the engine shaft is a shaft 43, which has a clutch plate 44 with which the friction clutch 41 engages when in operative position. Upon the opposite end it carries a bevel pinion 45 which is in constant mesh with duplicate gears 46, thus turning the latter in opposite directions. These gears are loosely mounted upon a transverse shaft 47 journaled in boxes 48 bolted to the frame, and are each provided with an inwardly projecting lug or pin 49, adapted to engage ratchet teeth 50 formed in the opposite ends of a reversing sleeve 51 mounted upon the shaft 47, and furnished with a groove 52 to receive the end of an arm 53 which projects horizontally from a vertical sleeve 54 carried by an upright steering rod 55 hereinafter described. The upper end of said sleeve is provided with a horizontal projecting operating lever 56 limited in movement by a guide plate 57 fixed to the upper surface of a housing 58 which serves to protect the reverse gearing. To the middle of the said reversing sleeve is mounted a driving sprocket 59 which is connected with the sprocket wheel 13 by a chain 60. It will be readily understood that when the pinion 45 is actuated by the motor, a movement of the operating or reversing lever 56 in one direction will cause the sleeve 51 to reciprocate upon its shaft in a corresponding direction and engage the pin 49 of the gear 46 upon that side, driving the traction wheel 11 in one direction. If the reversing lever is then thrown in the opposite direction the sleeve 51 will engage the lug of the other gear and its motion and that of the driving sprocket will be reversed, turning the traction wheel in the opposite direction.

The steering rod 55 before mentioned, is supported at the lower end by a bracket 61 secured by bolts 62 to a cross tie 63 fastened to the side members 8 at 64. The said rod pierces said tie piece and extends vertically through the sleeve 54 and is carried above the roof of the housing 58 its upper end carrying a hand wheel 65. Between the bracket 61 and the tie 63 the steering rod is supplied with a sector-gear 66 which engages a larger sector wheel 67 supported upon a cross piece 68 secured to the underside of the frame, and turning upon a center 69. Upon the side opposite to the geared portion is a radial arm 70 provided with a slot 71 which is engaged by a bolt 72 secured to a link rod 73 which extends laterally beyond the frame and is pivotally connected at each end to arms 74 fixed to the posts 18. By this arrangement the operator can readily turn the arbors 17 upon which the wheels 16 are journaled, by means of the hand-wheel 65, and guide the movement of the machine when traveling in either direction. A reversible seat 75 is provided for the operator so as to be convenient to the important operating levers. This seat is supported by transverse bars 76 fixed in the sides of the housing 58, the end of the seat passing beneath one of said bars, and resting upon the other, being kept in place by notches which engage the bar upon which the seat rests.

Near the front of the machine is a transverse rod 77 which passes through the frame members and is supported by blocks 78 and auxiliary frames 79 which are bolted to the main frame and extend laterally, their ends having vertical flanges 80, through which the ends of the rods 77 pass and are secured by nuts 81. The said rods are provided with threads 82 upon which sleeves 83, correspondingly threaded, are mounted. Each sleeve is provided with a clip 84 which is adapted to engage a clevis 85 pivoted thereto by a bolt 86. These clevises are shown attached by pins 87 to plow beams 88 having rearwardly projecting arms 89 to which are attached plows 90. These beams can be removed by withdrawing the pins 87 from the clevises and substituting various appliances therefor such as harrows, rollers, corn planters, cultivators, &c. The clip 84 can be adjusted laterally by turning the threaded sleeve 83, to suit any style of implement. Placed above the plow beams on either side are elevators by means of which the depth of the plows and other implements may be regulated, or by which they can be lifted clear of the ground when turning at the end of the furrow or when traveling along the road. These elevating devices are constructed as follows: A rod 91 one on each side of the machine, passes transversely above the plow beam arms 89, both ends of the rod being bent at right angles to form crank arms 92, 93, the outer arm 92 having its extremity 94 turned outward and journaled in a brace 95 which is secured at its forward end to the outer end of the screw 77 and at the rear is fastened to the outside of the main frame by bolts 96. The inner arm 93 is pivoted on a bolt which also passes through the end of a lever 97 which is provided with a detent dog 98 to engage notches 99 in a ratchet segment 100 fastened to the main frame. A brace 101 connects the lever with the rod 91 and the latter has depending hooks 102 which engage some portion of the implement frame, as seen in Fig. 1, where the said hooks are shown in engagement with the plow beam arms 89. The levers 97 are within easy reach of the operator's seat and it will be readily seen that by operating these levers the work of the cultivating implements is readily controlled by hand.

As the operator may at times have his hands fully occupied with the steering apparatus or other parts which need his attention, I have provided means for quickly lifting the plows by power supplied by the motor and brought into action by the foot. This is done by cam wheels 103 which are mounted upon the traction wheel 11 concentric with its axle, and adapted to engage levers 104 when the latter are projected into the path of movement of said wheels. Said levers are pivoted to the arms 105 of a rock shaft 106 journaled in brackets 107, secured to a plate 108 and held in retracted position by a spring 109. A forwardly projecting arm 110 of the shaft 106 is pivotally connected to a foot lever 111, which can be easily reached by the operator. The rear end of each lever 104 passes through and is supported by the down turned ends 112 of an arm 113 formed integral with a rock shaft 114 which passes through a sleeve 115 in the frame, and has a forwardly bent arm 116 extending beneath the cross rod 91. The levers 104 have a loose fit in the ends of the crank arms 113 and when the foot lever 111 is operated the free ends of said levers 104 are thrust rearwardly into the path of movement of the cam wheels 103, and the cam surfaces 117 will engage and depress the levers at the same time turning the rock shafts 114 and elevating the said arms 116 which carry with them the transverse rods 91 and the attached implements. This procedure is very useful in case some obstruction is encountered as the plows on both sides of the machine can be quickly thrown entirely out of the ground with very slight effort on the part of the operator.

The operation of the machine will be readily understood without a detailed description further than has already been set out in the specification. When the operator occupies the seat provided for him all the various levers are within reach, and he can control the motor, guide and turn the machine, reverse the traction wheel and elevate or depress the plows or cultivators, either singly or together, without leaving his seat. If the apparatus is to be used for traction alone the seat is reversed, as shown in dotted lines in Fig. 1 and the machine driven with the traction wheel forward, the wagon or other vehicle being attached to the axle by passing a king bolt through the projection 31 and the eye 22 of the bolt.

It is obvious that various changes may be made in the design and construction of my invention as herein disclosed without departing from the spirit and scope thereof, and I do not wish, therefore, to be limited to the precise construction set forth.

Having thus described my invention what I claim as new and desire to secure by Letters Patent, is:—

1. An apparatus for the purpose specified including a frame, a traction wheel having a divided tread, a gear wheel carried by the said traction wheel and located in the median plane, guiding wheels, a motor carried on the frame, gearing connection between the motor and the said gear wheel and means for disconnecting the motor from said gearing.

2. An apparatus for the purpose stated, including a frame, a traction wheel provided with a double tread, a sprocket wheel carried by said traction wheel, guiding wheels, a motor carried on the frame, gearing connection between the motor and the said sprocket wheel, reversing means for the gearing, means for disconnecting the motor from the said gearing, and operating means for said guiding wheels.

3. An apparatus for the purpose specified including a frame, a trunnion secured to one end of said frame, an axle journaled to oscillate on said trunnion, steering wheels, and a traction wheel provided with a double tread, and having a gear wheel located in the interval between the two divisions of the tread.

4. An apparatus for the purpose specified, including a frame, a motor, a traction wheel, a trunnion fixed to one end of said frame, an axle mounted to oscillate on said trunnion, steering wheels journaled on said axle, gearing connecting said motor and traction wheel, reversing means for said gearing, and means for operating said steering wheels to guide the apparatus.

5. An apparatus for the purpose specified, including a frame, a motor, a traction wheel, a trunnion fixed to one end of said frame, an axle mounted to oscillate on said trunnion, ground wheels journaled on said axle, drive gearing connecting said motor and traction wheel, reversing means for said gearing, means for disconnecting the motor mechanism from the said drive gearing and means for operating said ground wheels to guide the apparatus.

6. An apparatus for the purpose specified, including a frame, a motor, a traction wheel, a trunnion fixed to said frame, an axle mounted to oscillate on said trunnion, ground wheels journaled on said axle, drive gearing connecting said motor with the traction wheel, reversing means for said drive gearing, means for disconnecting the motor mechanism from the said drive gearing, means for transmitting power from the motor to auxiliary machinery, and means for operating said ground wheels to guide the apparatus.

7. An apparatus for the purpose stated, including a frame, a motor, a traction wheel, a trunnion fixed to the frame, an axle mounted to oscillate on said trunnion, guide plates to limit the movement of said axle on the trunnion, ground wheels journaled on the axle, drive gearing connecting the motor with said traction wheel, reversing means for said drive gearing, means for disconnecting the motor mechanism from the drive gearing, means for transmitting power from the motor to auxiliary machinery, steering means for the ground wheels, and means for attaching various implements to the frame.

8. An apparatus for the purpose specified, including a frame, a motor carried on said frame, a traction wheel, an axle mounted to oscillate on a trunnion fixed to the frame, guide plates for said axle, ground wheels journaled on said axle, driving means for said traction wheel, steering means, and adjustable means for attaching implements to the frame.

9. An apparatus for the purpose specified, including a frame, a motor carried on said frame, a traction wheel, an axle mounted to oscillate on a trunnion fixed to said frame, guide plates for said axle, ground wheels journaled on the axle, driving means for said traction wheel, steering means, a pulley for transmitting power to auxiliary machinery a slide frame attached to the main frame, means for attaching implements to said side frame, and a reversible seat for the operator.

10. An apparatus for the purpose specified including a frame, a motor carried on said frame, a traction wheel, an axle mounted to oscillate on a trunnion fixed to the frame, guide plates for said axle, ground wheels mounted on said axle, driving gear connecting the motor with the traction wheel, steering means, means connected with the motor for transmitting power to auxiliary machinery, a side frame attached to the main frame on either side, adjustable means supported on said side frames for attaching implements, means for attaching a vehicle to the said axle, and a reversible seat for the operator.

11. An apparatus for the purpose specified including a frame, a motor, a traction wheel, an axle adapted to swing on a trunnion and having guide plates to limit its movement, ground wheels mounted in the axle, driving gearing connecting the motor with said traction wheel, reversing means for said driving gearing, means for disconnecting the motor from said driving gearing, steering means, a pulley connected to the motor for transmitting power, a threaded rod extending laterally from the main fame and supported by auxiliary framework, a plurality of sleeves having threads adapted to engage said threaded rod, each sleeve being provided with means for attaching implements, means for attaching a vehicle to said axle, and a reversible seat.

In testimony whereof I affix my signature in presence of two witnesses.

PAUL H. MUNROE.

Witnesses
 JOHN VAN HORN,
 PETER A. BRONK.